(12) United States Patent
Goff et al.

(10) Patent No.: US 7,690,719 B2
(45) Date of Patent: Apr. 6, 2010

(54) ARTICULATING INTERLOCKING STRUCTURAL EXTRUSIONS FOR RECREATIONAL VEHICLES AND THE LIKE

(75) Inventors: Richard J. Goff, Menifee, CA (US); Dennis T. Bernabe, Corona, CA (US); James V. Bertoch, Murrieta, CA (US); Christopher Parcell, Murrieta, CA (US); Lauro Budica, Mira Loma, CA (US); Alexander A. LeReaux, Redlands, CA (US)

(73) Assignee: Monaco Coach Corporation, Coburg, OR (US)

( * ) Notice: Subject to any disclaimer, the term of this patent is extended or adjusted under 35 U.S.C. 154(b) by 298 days.

(21) Appl. No.: 11/879,308

(22) Filed: Jul. 17, 2007

(65) Prior Publication Data
US 2009/0021046 A1  Jan. 22, 2009

(51) Int. Cl.
*B62D 27/06* (2006.01)

(52) U.S. Cl. .................. 296/191; 52/591.1; 296/29; 296/193.05

(58) Field of Classification Search ............... 52/272, 52/582.1, 591.1, 592.1, 592.4; 296/29, 30, 296/156, 186.1, 191, 193.05, 203.03; 403/348, 403/349, 381, 382
See application file for complete search history.

(56) References Cited

U.S. PATENT DOCUMENTS

| | | | | |
|---|---|---|---|---|
| 1,534,468 A | * | 4/1925 | Shea, Jr. ............... 403/382 |
| 2,460,982 A | | 2/1949 | Gilpin |
| 2,489,670 A | | 11/1949 | Powell, Jr. |
| 2,496,184 A | * | 1/1950 | Von Canon ........... 144/354 |
| 2,730,772 A | * | 1/1956 | Jones .................... 52/272 |
| 3,027,187 A | * | 3/1962 | Rivers ................... 296/186.1 |
| 3,640,191 A | * | 2/1972 | Hendrich .............. 404/41 |
| 3,834,575 A | * | 9/1974 | Carr ...................... 220/1.5 |
| 3,938,856 A | | 2/1976 | Janssen |
| 3,968,989 A | | 7/1976 | Schippers |
| 4,403,804 A | | 9/1983 | Mountz et al. |
| 4,494,790 A | | 1/1985 | Omura |
| 4,662,138 A | | 5/1987 | Bryant |
| 4,787,670 A | | 11/1988 | Bentz |
| 5,172,743 A | | 12/1992 | Wallace et al. |

(Continued)

FOREIGN PATENT DOCUMENTS

DE  4237410 A1 *  5/1994

(Continued)

*Primary Examiner*—Glenn Dayoan
*Assistant Examiner*—Paul A Chenevert
(74) *Attorney, Agent, or Firm*—Baker & Daniels LLP (57) ABSTRACT

A structural assembly such as for use in constructing a living space of a recreational vehicle includes a wall with vertical rails at the top and bottom. The rails fitting into complementary recess within floor and ceiling members. The bottom rail has a curved cross section and fits into a complementary shaped curved channel in a floor member such that to assemble the wall to the floor, the wall is rested on the floor member at an angle and is then tilted upright to lock it to the floor member. A first keeper is then placed into a gap between the wall and the floor member, and acts in compression to prevent rotation of the wall. A second keeper has portions that fit into recesses in the wall and the ceiling members, respectively. The second keeper acts in tension to prevent vertical separation of the wall and the ceiling.

24 Claims, 6 Drawing Sheets

U.S. PATENT DOCUMENTS

| | | | |
|---|---|---|---|
| 5,218,792 | A | 6/1993 | Cooper |
| 5,553,906 | A * | 9/1996 | Kunz .......................... 296/29 |
| 5,829,825 | A | 11/1998 | Kim |
| 5,865,498 | A | 2/1999 | Grogan |
| 6,085,469 | A | 7/2000 | Wolfe |
| 6,224,125 | B1 | 5/2001 | McCormack |
| 6,224,126 | B1 | 5/2001 | Martin et al. |
| 6,227,607 | B1 | 5/2001 | Dewald, Jr. et al. |
| 6,250,701 | B1 | 6/2001 | Vance |
| 6,290,285 | B1 | 9/2001 | McCormack |
| 6,557,955 | B2 * | 5/2003 | Saravis ....................... 312/111 |
| 6,763,643 | B1 * | 7/2004 | Mangrtensson ............ 52/586.1 |
| 7,175,202 | B2 | 2/2007 | Budica |
| 2004/0045225 | A1 * | 3/2004 | Weiss ......................... 52/36.1 |
| 2004/0111988 | A1 * | 6/2004 | Toben et al. .................. 52/250 |
| 2006/0237992 | A1 * | 10/2006 | Lemmons ................ 296/186.1 |
| 2009/0107076 | A1 * | 4/2009 | Kim ......................... 52/582.1 |

FOREIGN PATENT DOCUMENTS

| | | | |
|---|---|---|---|
| EP | 5120 | A1 * | 10/1979 |
| EP | 335427 | A2 * | 10/1989 |
| JP | 03021759 | A * | 1/1991 |

* cited by examiner

ARTICULATING INTERLOCKING STRUCTURAL EXTRUSIONS FOR RECREATIONAL VEHICLES AND THE LIKE

CROSS-REFERENCE TO RELATED APPLICATIONS

None.

BACKGROUND OF THE INVENTION

1. Field of the Invention

This invention relates to the field of structural members. More particularly, this invention relates to the field of articulated interlocking structural extrusions for recreational vehicles and the like.

2. Description of Related Art

Structural members made of lightweight materials such as aluminum are well known. Extrusions made from aluminum are popular for use in applications in which structural members must be strong but lightweight.

In recreational vehicles such as motor homes, the need is particularly acute for strong structural members. Both towed and self propelled recreational vehicles experience vibration on the road and around curves, jars and jolts over bumps and potholes, and experience high winds associated with highway travel, sometimes into a strong headwind which greatly increases the wind speed experienced by the structure. Each structural member of a recreational vehicle must therefore not only strong by itself, but the assembled structure as a whole must be firmly and strongly held together. At the same time, the structural members in recreational vehicles must be lightweight for reasons of fuel efficiency, vehicle stability, and tire wear. For these reasons, extruded aluminum structural members have been used by some recreational vehicle manufacturers as preferred structural members.

Another requirement of the recreational vehicle industry is that the structure be easily assembled. U.S. Pat. No. 5,218,792 issued to Cooper shows a housing structure for use in recreational vehicles which uses aluminum extrusions having a honeycomb structure for strength. The aluminum extrusions are riveted together. U.S. Pat. No. 5,553,906 issued to Kunz shows extruded aluminum floors and sidewall members, and discloses a method of joining those members together which relies on sets of complementary sets of teeth to interlock those members together.

SUMMARY OF THE INVENTION

The present invention is of interlocking structural members. The members are particularly well suited for use in constructing the living space of a recreational vehicle such as a motor home or a towed trailer.

In the illustrative embodiment, the bottom portion of a wall, made of extruded aluminum, has a first and downwardly extending curved tongue or rail that has a generally J-shaped cross section. The rail is partially inserted into a corresponding curved groove or slot in a floor member at an angle thereto. The wall is then rotated to its final upright position. In this position the wall is sufficiently locked, via the curved tongue in the curved groove, to the floor member that it cannot be lifted straight out from the floor member. A floor keeper is then inserted into a gap formed between a portion of the floor member and a portion of the wall to firmly hold the wall into its upright position, i.e., locked into the floor member. The wall is now prevented from moving horizontally by the fit of the tongue into the floor groove and by other abutting surfaces of the floor and sidewall members, is prevented from moving vertically by the curve of the tongue fitting into the curve of the floor groove, and is prevented from rotating out of that position by the keeper. The floor keeper is then secured in place by a series of small fasteners such as screws or rivets. Taken together, the floor and sidewall members and the floor keeper carry virtually all of the structural stresses experienced by the assembly in use. The fasteners carry virtually none of those stresses. Furthermore, the floor and sidewall members, which are large and could be awkward to handle in large applications such as recreational vehicles, are easily assembled and locked together by a small number of workmen using minimal lifting and positioning equipment. In the illustrative embodiment, the sidewalls can be articulated and thereby locked into the floor members with only two workmen working without any assistance from mechanical lifts or other assembly machinery, and the keepers thereafter installed by those same workmen.

The top portion of the wall also has a second and upwardly extending tongue or rail. That second tongue fits into a corresponding groove or slot in a roof corner member. Once the corner piece, which in most cases will already be welded to the rest of the roof frame, has been lowered onto the wall, the fit of the tongue into the groove prevents relative horizontal movement of the wall and the roof corner member. Both the wall and the top corner member also have additional generally horizontal slots in them, preferably along the outside surfaces. A roof keeper having two generally horizontal protrusions disposed vertically apart is then inserted into the two horizontal slots. The roof keeper acts in tension to prevent the corner piece from being pulled upward away from the wall. The wall and the corner piece are thus locked together, preventing relative movement either vertically or horizontally. Taken together, the fit of the top tongue into the roof corner groove, in combination with the roof keeper, carry virtually all of the structural stresses experienced by the assembly in use. The roof keeper is held in place via small fasteners such as screws or rivets which do not carry any structural stresses.

As an additional feature of the invention, the structural members have various protrusions and recesses suitable for precise positioning of other components such as floor, wall, and ceiling panels, and for tucking items such as the tail edges of ceiling fabric. Still further, the top keeper includes an integrated awning keeper, and the roof corner member includes a concave channel which defines an integrated rain gutter to channel water toward the front or back of the vehicle and thus prevent rain water from running down from the roof and staining the sides of the vehicle.

In one aspect of the invention, therefore, the invention is of a structural assembly for a recreational vehicle wall. The assembly may be fabricated from extruded aluminum, and includes a first structural member defining a wall or a wall member having a J-shaped tongue extending from a bottom edge of the wall, a second structural member defining a floor member or a wall support member having a J-shaped groove generally but not necessarily exactly complementary to the J-shaped tongue, wherein to assemble the wall to the floor the tongue is first partially inserted into the groove, and the wall is thereafter articulated upwards to insert the tongue fully into the groove thereby locking the wall to the floor member. The shape of the groove defines a tongue engagement feature, and the shape of the tongue defines a groove engagement feature. A keeper is thereafter inserted into a gap between the wall and the floor member, preventing rotation of the wall which would unlock the wall from the floor.

In another aspect, the invention is of a method of locking a vehicle wall to a vehicle floor, the method including the steps of providing a wall having an articulating locking mechanism, providing a floor or a wall support having an articulating locking mechanism to mate with and thereby lock with the articulating locking mechanism of the wall, positioning the wall at an angle relative to vertical such that the wall articulating locking mechanism partially engages the wall support locking mechanism, and tilting the wall upright into a generally vertical position, the wall articulating locking mechanism increasingly engaging the wall support locking mechanism as the wall is tilted upright to lock the wall to the wall support or floor.

In another aspect, the invention is of a structural assembly that includes a wall having a rail having a contoured cross section at or near its bottom edge, a wall support having a recess that has a contoured cross section, the rail and recess having complementary contoured shapes such that the wall may be articulated relative to the wall support to engage the wall to the wall support, the contoured shape of the recess engaging the complementary contoured shape of the rail to prevent the rail from being pulled upward away from the wall support when the wall is in its full upright position. A keeper engages respective portions of the wall member and the wall support to prevent relative rotation of those members.

In yet another aspect, the invention is of an assembly for connecting a wall to either the floor or roof of a vehicle, the assembly comprising first and second members having a tongue in one member that engages a corresponding groove in the other member to prevent relative horizontal movement of the two members, and a keeper that prevents relative vertical movement of the two members, the keeper acting in either tension or compression to carry the structural stresses without placing stresses on any fasteners other than the keeper. The invention therefore avoids placing any structural stresses on fasteners such as screws, rivets, or bolts that are used to hold walls to floors or to corners or roofs as in previous designs.

The invention is particularly well suited for use with extruded aluminum members in recreational vehicles such as motor homes and trailers. However, as those skilled in the art will appreciate the invention has broader applications as well.

Exemplary embodiments of the invention will be further described below with reference to the drawings, in which like numbers refer to like parts.

DETAILED DESCRIPTION OF THE PREFERRED EMBODIMENTS

Figure 1:
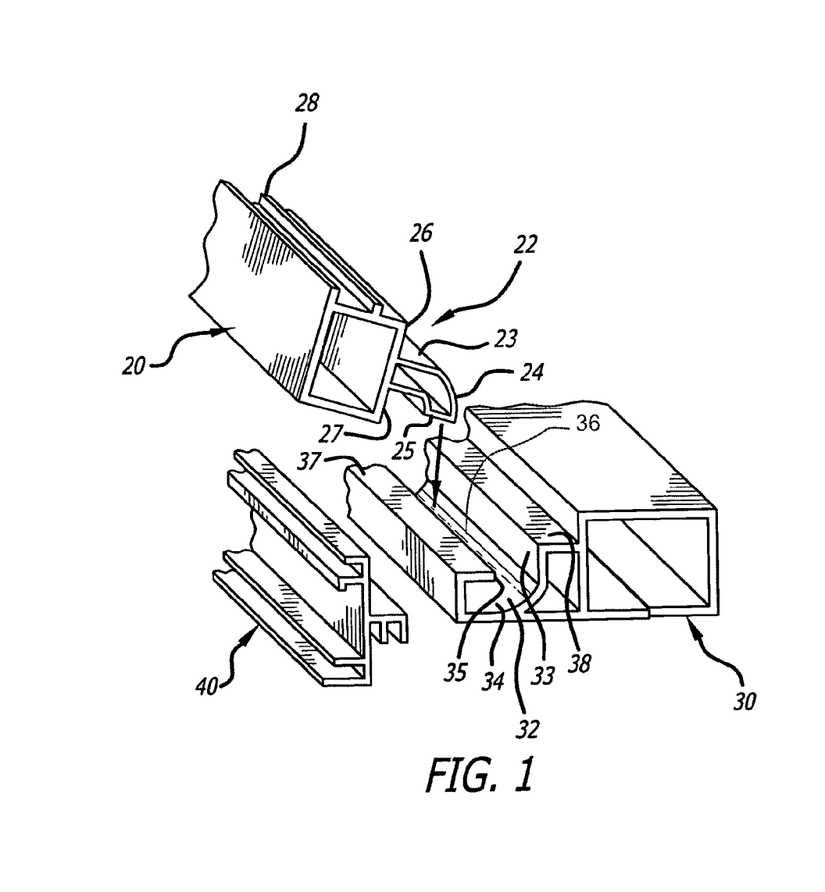
FIG. 1 is a perspective view of a structural floor assembly according to an illustrative embodiment of the invention, including a wall member, a corresponding floor member, and a floor keeper.
Figure 9:
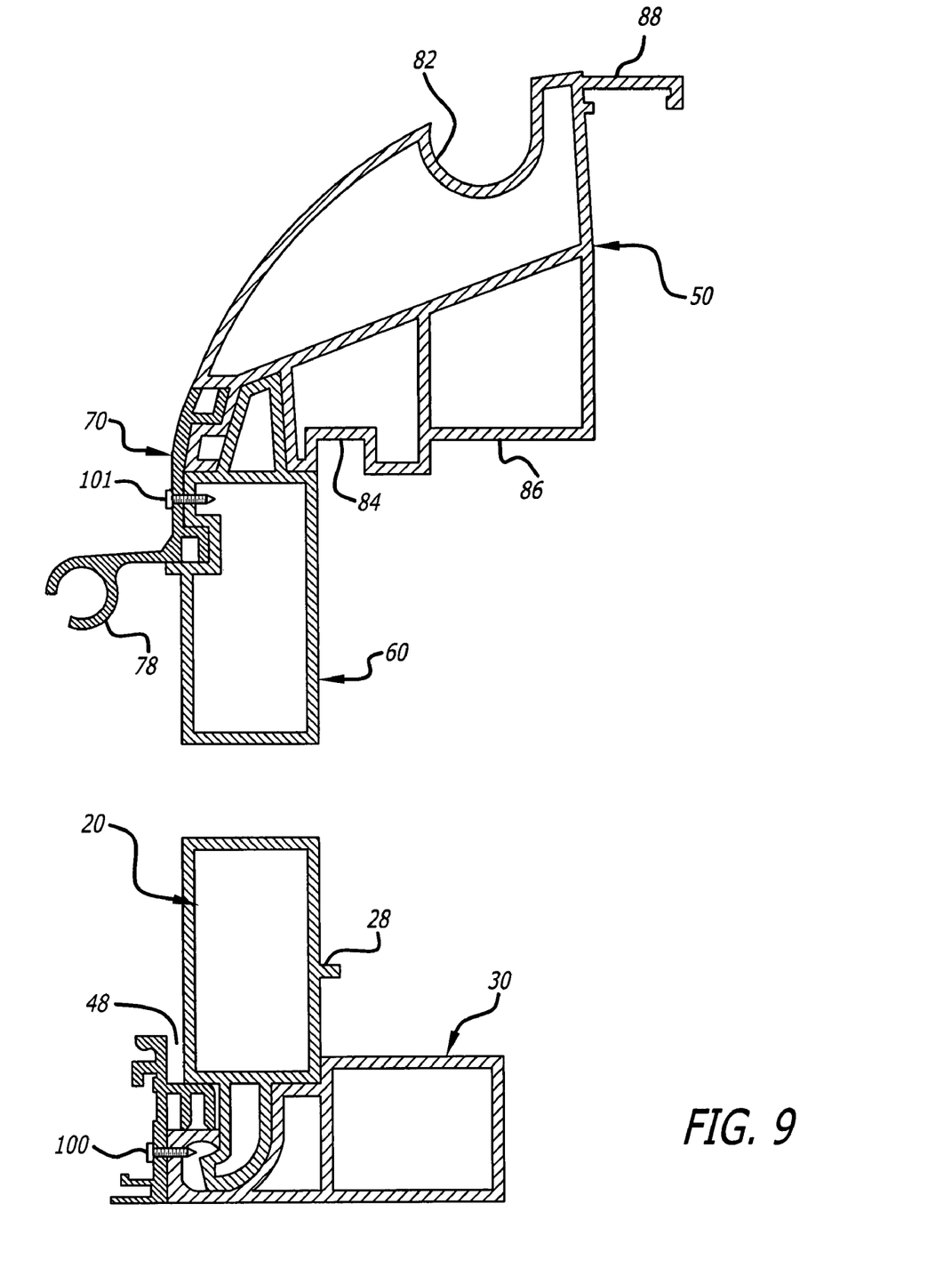
FIG. 9 is a cross sectional view of the completed assemblies of FIGS. 5 and 8.

FIG. 1 shows a wall and floor assembly according to an illustrative embodiment of the present invention. The assembly includes a bottom wall member 20, a floor member 30, and a keeper 40. Bottom wall member 20 may be welded by this time to structural channel members that define wall studs, with a wall top member welded to the wall studs, so as to define a single structural wall unit (FIG. 9). Bottom wall member 20 may therefore also be referred to simply as wall 20.

Wall 20 has a rail or tongue 22 extending generally downwardly from the bottom thereof. Tongue 22 is curved, and more particularly, is generally J-shaped, having a straight portion 23, a curved portion 24, and a distal most portion 25. It is not strictly required that tongue 22 be J-shaped. The distal most extent 25 of tongue 22 could be defined by, for example, a curve of tongue 22 as shown in the figure, or an angle, or a protrusion therefrom. A generally horizontal and planar bottom surface 26 is adjacent tongue 22. Wall 20 optionally has a ledge 28, whose function will be described later, extending inwardly toward the interior living space of the vehicle.

Floor member 30 is preferably affixed by this time to the vehicle floor, floor support, or chassis via welding, bolting, or other means. Floor member 30 may therefore also be referred to simply as floor 30. Because floor member 30 provides a support surface on which wall 20 will rest, floor member 30 may also be referred to as a wall support.

Floor 30 has a generally downwardly extending groove or slot 32 formed therein. Groove 32 is generally J-shaped, having a straight portion 33 on a first side of groove 32, a curved portion 33 having an arc of about 90° and a recess 34 at a distal most portion of groove 32. Groove 32 therefore has a shape that is generally complementary to the J-shape of tongue 22. On a second side of groove 32 opposite the first side, groove 32 is defined in part by a ledge 35 having an uppermost extent defining a generally horizontal surface 37. Groove 32 therefore has a shape that is not exactly the same shape as tongue 22. However, the two shapes correspond sufficiently for mating engagement of tongue 22 into groove 32. Groove 32 has an uppermost extent at a generally horizontal surface 38 which will, at least in part, support wall 20. Horizontal surfaces 37 and 38, which correspond to the uppermost extent of ledge 35 on a first side of groove 32, and the uppermost extent of groove 32 on a second and opposite side of groove 32, respectively, are located at different vertical levels.

Floor 30 has a generally downwardly extending groove or slot 32 formed therein. Groove 32 is generally J-shaped, having a straight portion 33 on a first side of groove 32, a curved portion 36 having an arc of about 90° and a recess 34 at a distal most portion of groove 32. Groove 32 therefore has a shape that is generally complementary to the J-shape of tongue 22. On a second side of groove 32 opposite the first side, groove 32 is defined in part by a ledge 35 having an uppermost extent defining a generally horizontal surface 37. Groove 32 therefore has a shape that is not exactly the same shape as tongue 22. However, the two shapes correspond sufficiently for mating engagement of tongue 22 into groove 32. Groove 32 has an uppermost extent at a generally horizontal surface 38 which will, at least in part, support wall 20. Horizontal surfaces 37 and 38, which correspond to the uppermost extent of ledge 35 on a first side of groove 32, and the uppermost extent of groove 32 on a second and opposite side of groove 32, respectively, are located at different vertical levels.

Figures 3, 4, 5:
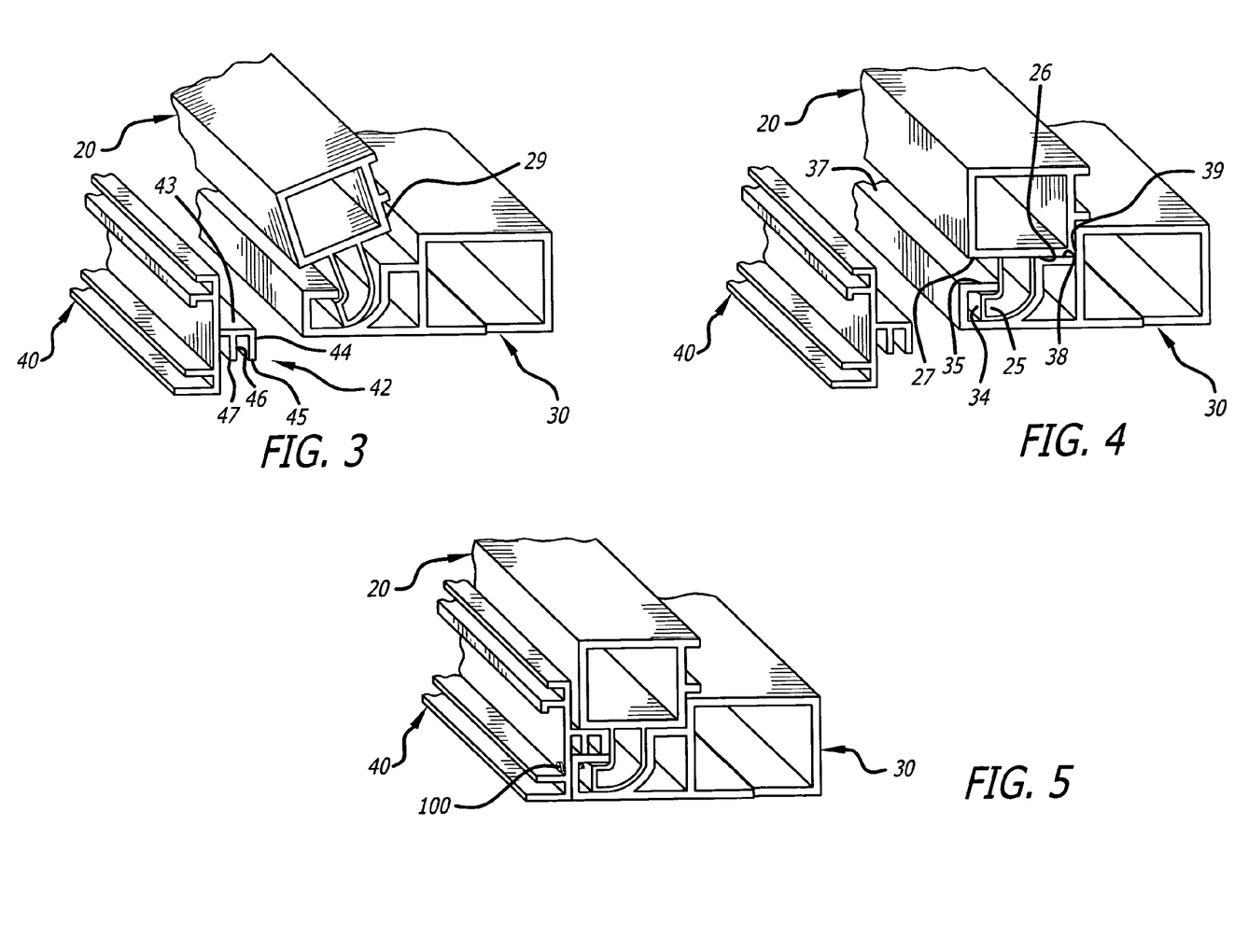
FIG. 3 shows the assembly components of FIG. 1, with the wall now having been tilted to its nearly final position.
FIG. 4 shows the assembly components of FIG. 1, with the wall now having been tilted into its final vertical position.
FIG. 5 shows the assembly components of FIG. 1, with the floor keeper installed.

FIG. 3 shows wall 20 having been tilted up nearly to its full vertical position. As can be seen from the figures, as wall 20 is tilted upright to approach its final vertical position, groove 32 increasingly engages tongue 22 by virtue of the tongue being slid farther into groove 32 as wall 20 is rotated up relative to the floor.

Figure 2:
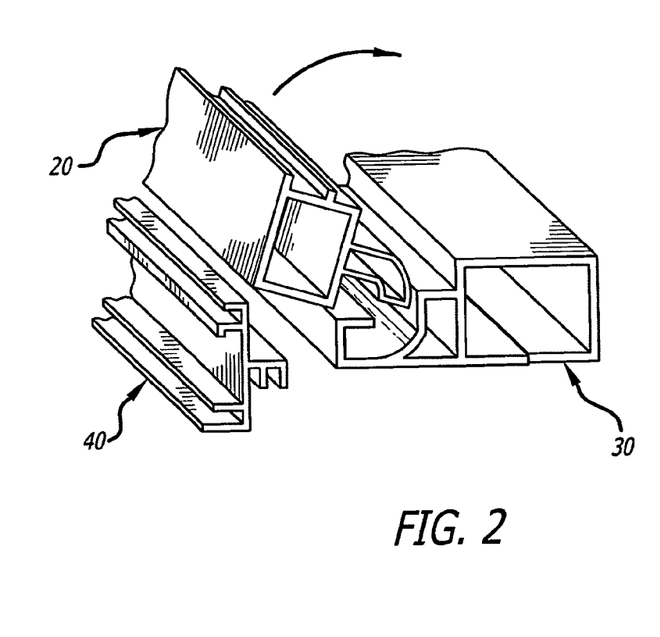
FIG. 2 shows the assembly components of FIG. 1, with the distal extent of the tongue of the wall member being inserted into the groove in the floor member.

FIG. 4 shows wall 20 now rotated into its final, full vertical and upright position relative to floor 30. Tongue 22 is now fully inserted into groove 32. The distal most portion 25 of tongue 22 rests within recess 34 of groove 32, underneath and engaged by the edge of ledge 35. In this position wall 20 and floor 30 are prevented from moving horizontally relative to each other by means of tongue 22 being inserted into groove 32 and horizontally constrained on one side by straight portion 33 of groove 32, and on the other side by ledge 35. Additional side-to-side structural support is provided by vertical portion 29 (FIG. 3) of wall 20 butting up against vertical surface 39 of floor member 30. Furthermore, tongue 22 is engaged by an overhanging portion of groove 32, preventing tongue 22 from being pulled vertically away from floor 30. Wall 20 is thus prevented from moving either horizontally or vertically relative to floor 30. The only degree of freedom remaining for wall 20 is rotational movement opposite the direction of the rotational arrow in FIG. 2. This last degree of freedom is eliminated by floor keeper 40 being installed.

FIG. 5 shows floor keeper 40 inserted into a gap defined by the space between generally horizontal surface 27 of wall member 20 and generally horizontal surface 37 of floor member 30. Referring to FIG. 3 for clarity, floor keeper 40 includes a rail 42 that extends into and fills the gap between wall member 20 and floor member 30. Keeper rail 42 has a horizontal portion having a first upwardly facing generally horizontal surface 43, and two vertical ribs 44 and 46 which define downwardly facing generally horizontal surfaces 45 and 47. Constructing keeper rail 42 in this way is both extrusion friendly, and provides vertical ribs 44 and 46 which provide strong resistance in compression against rotation of wall member 20. Keeper rail 42 therefore effectively fills the gap for structural purposes without needing to be a solid structure that completely fills the gap. Keeper 40 may be held to floor member 30 by small fasteners such as screws 100 which may be self tapping screws, sheet metal screws, or machine screws or bolts which screw into tapped holes in floor member 30. Rivets or other fasteners could be substituted.

As will be apparent from the foregoing description, tongue 22 defines a wall articulating locking means, and groove 32 defines a floor articulating locking means or a wall support articulating locking means, with the wall and the floor being locked together by positioning the wall at an angle relative to vertical and such that the wall articulating locking means partially engages the wall support locking means, and tilting the wall upright into a generally vertical position, the wall articulating locking means increasingly engaging the wall support locking means as the wall is tilted upright to lock the wall to the wall support.

Figure 6:
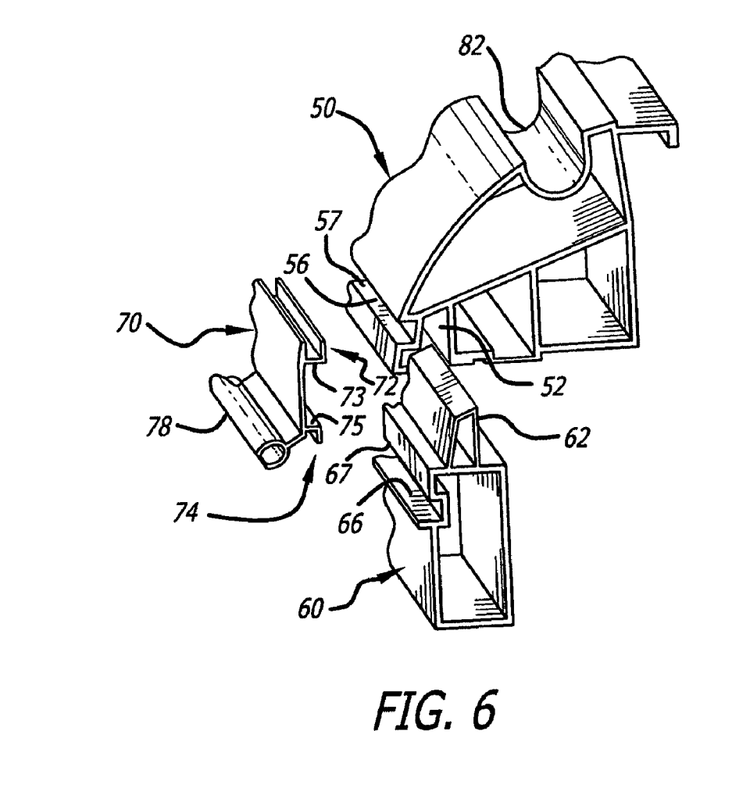
FIG. 6 is a perspective view of a structural roof assembly according to an illustrative embodiment of the invention, including a wall member, a corresponding roof corner member, and a roof keeper.

FIG. 6 is a perspective view showing the components of the top wall and corner assembly. The assembly includes top corner member 50, top wall member 60, and roof keeper 70. Top wall member 60 may be welded by this time to structural channel members that define wall studs, with a bottom wall member welded to the wall studs, so as to define a single structural wall unit (FIG. 9). Top wall member 60 may therefore also be referred to simply as wall 60. Top corner member 50 may be referred to as corner 50 for short.

Wall 60 has a generally vertically protruding tongue 62 which fits into corresponding generally vertically recessed groove 52 formed in corner 50. Wall 60 also has a channel 66 in it having a generally horizontal surface 67. Corner 50 has a channel 56 in it having a generally horizontal surface 57. Channels 56 and 66 define channels that extend longitudinally along the length of the vehicle.

Roof keeper 70 has two rails 72 and 74 having horizontal surfaces 73 and 75, respectively. Rails 72 and 74 define rails that extend longitudinally along the length of the vehicle. In the embodiment shown roof keeper 70 also has an integrally formed awning keeper 78 which in the embodiment shown is a tubular member having a generally C-shaped cross section, and extending longitudinally along the length of the vehicle. Although integrated awning retainers have been incorporated into motor homes before, such as in U.S. Pat. No. 6,224,125 issued to McCormack which shows an awning retainer integrally formed in a recreational vehicle structural corner member, by forming the awning retainer 78 as part of roof keeper 70, awning retainer 78 can be easily replaced if it is damaged, or a different awning retainer may be incorporated into the vehicle simply by installing a different roof keeper. The awning retainer of the present invention therefore provides greater flexibility and replaceability.

For structural integrity, wall 60 is preferably a single piece that extends the entire length of the living area, and may be fabricated by welding or otherwise fastening together different sections to form a single structural piece. In contrast, the keeper 70 may include several different discrete keeper sections which need not be welded or otherwise affixed together because keeper 70 does not carry structural stresses of the vehicle other than to prevent corner 50 from pulling upward away from wall 60.

Figure 7:
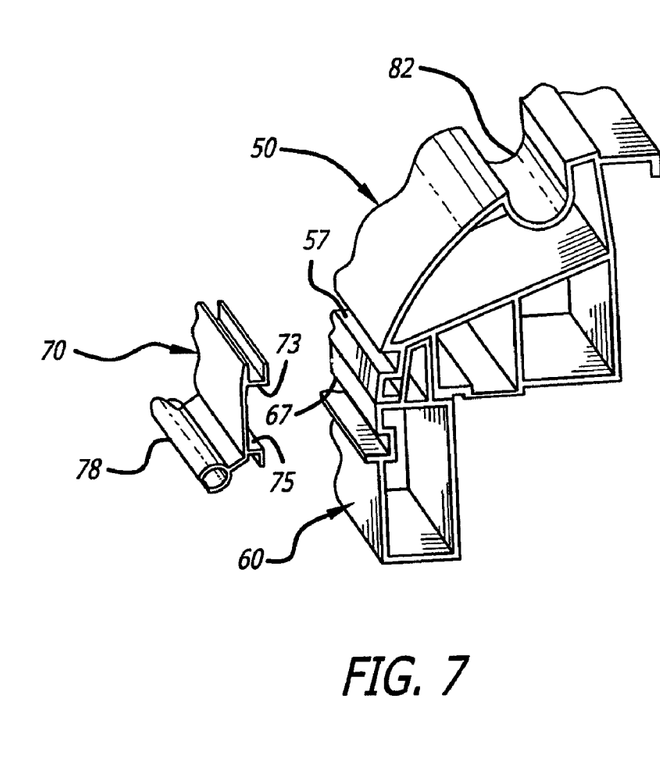
FIG. 7 shows the assembly components of FIG. 6, with the roof corner member assembled to the wall member.

FIG. 7 shows corner 50 positioned onto wall 60 so that tongue 62 is received into groove 52. In this position corner 50 and wall 60 are prevented from moving horizontally with respect to each other. Roof keeper 70 is ready to be installed.

Figure 8:
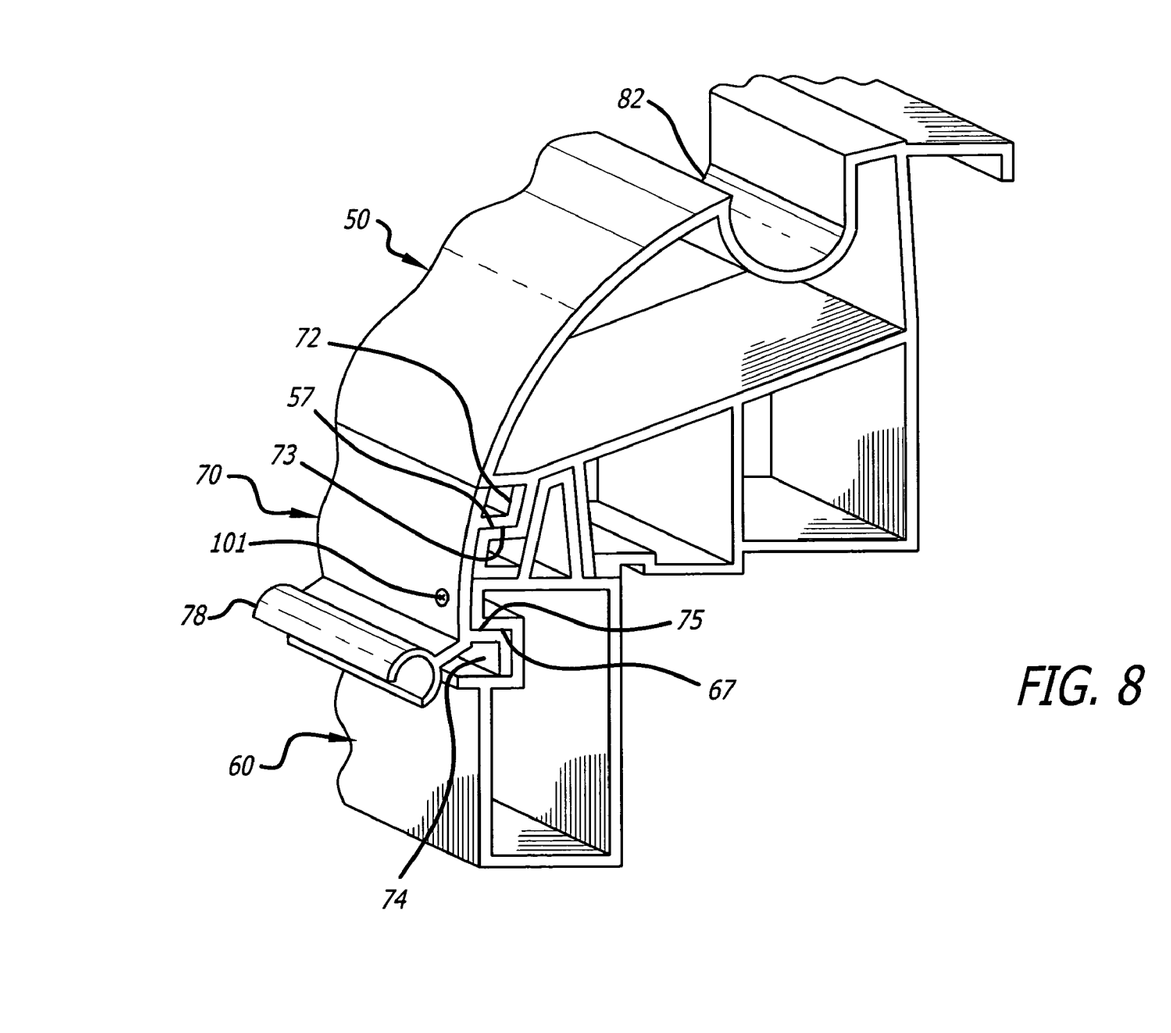
FIG. 8 shows the assembly components of FIG. 6, with the roof keeper installed.

FIG. 8 shows the top corner assembly including installed roof keeper 70. Roof keeper 70 has been installed by being slid generally horizontally so that first keeper rail 72 fits into corresponding channel 56 in corner member 50, with generally horizontal surface 73 of keeper rail 72 butting against generally horizontal surface 57 of corner member 50. Similarly, second keeper rail 74 fits into channel 66 in wall member 60, with generally horizontal surface 75 of keeper rail 74 butting against generally horizontal surface 67 of wall member 60. In the installed position shown, roof keeper 70 acts in tension to prevent vertical separation of corner 50 from wall 60. Corner 50 is thus prevented from moving either horizontally or vertically relative to wall 60.

Roof keeper 70 may be held to wall 60 or to corner 50 by small fasteners such as screws 101 (FIG. 9) which may be self tapping screws, sheet metal screws, or machine screws or bolts which screw into tapped holes in wall 60 or corner 50. Rivets or other fasteners could be substituted.

Figure 10:
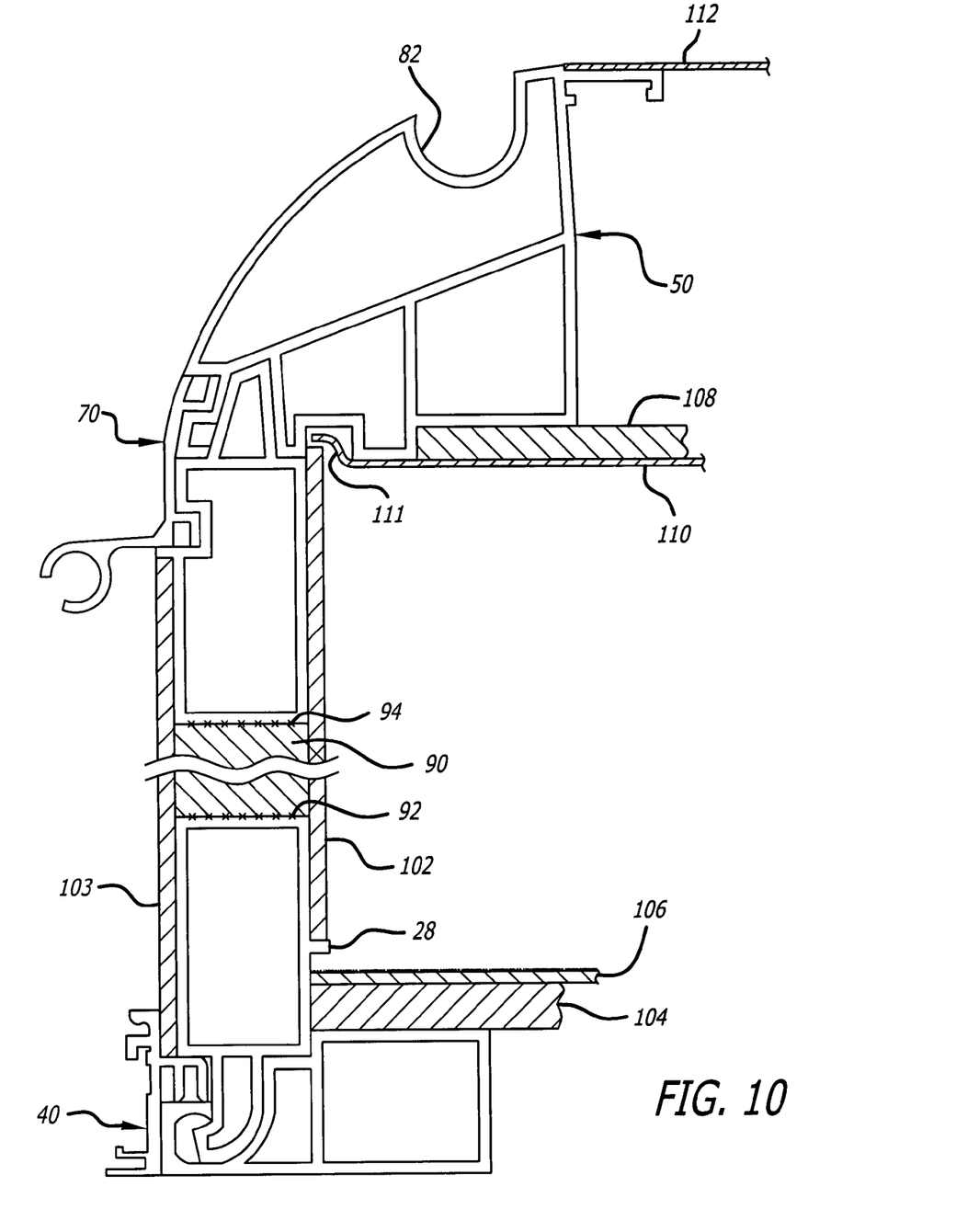
FIG. 10 is a cross sectional view of the completed assemblies of FIGS. 5 and 8, with additional interior and exterior floor, ceiling, and wall panels.

FIG. 10 shows a completed wall assembly including bottom wall member 20 locked into floor member 30, and top wall member 60 locked into corner member 50. Aluminum structural channels 90 defining wall studs are welded at welds 92 and 94 to bottom wall member 20 and top wall member 60, respectively. The voids between studs are filled with foam material (not shown) for additional structural support and rigidity, and to provide thermal insulation.

As additional and optional features of the invention, the structural components may include various non-structural features integrated therein including various panel positioning features. In the embodiment shown in FIG. 6, corner member 50 includes a rain gutter 82 integrally formed therein as a channel having a generally semicircular cross section. Rain gutter 82 extends along left and right corners from near the front of the vehicle to the rear of the vehicle in order to channel rain water away from running down the sides of the vehicle, which can leave unsightly water stains.

In the embodiment shown in FIG. 10 wall member 20 includes a ledge 28 extending longitudinally along the length of the vehicle, which is used to position and support an interior wall panel 102 which may be made of plywood. Ledge 28 preferably protrudes a distance from the wall member 20 equal to the thickness of interior wall panel 102. Ledge 28 also extends over floor plywood panel 104 and carpet 106 to help cover the edges of those components.

A gap 48, defined by a space between bottom wall member 20 and floor keeper 40 (FIG. 9), may be used to position and hold an exterior wall panel 103 such as a sheet of fiberglass siding (FIG. 10).

A recess 84 (FIG. 9) formed in corner member 50 is used to hold an upper edge of interior wall panel 102, and also to tuck therein a tail 111 of fabric from ceiling covering material such as vinyl head liner 110 (FIG. 10).

A recess 86 (FIG. 9) positions and helps hold a ceiling panel such as plywood panel 108 (FIG. 10).

An exterior recess 88 (FIG. 9) positions and holds roofing material 112 such as a sheet of suitable roofing material (FIG. 10).

In the illustrative embodiment floor keeper 40 fits snugly into its corresponding gap between wall 20 and floor member 30. Similarly, rails 72 and 74 of roof keeper 70 fit snugly into the corresponding channel 56 in corner member 50 and channel 66 in wall 60, respectively. A snug fit helps prevent rattling or movement between the components of the assembly during use of the vehicle, and helps maintain the pieces in place during assembly.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, although the invention is well suited for use with structural members made of extruded aluminum, the members could be made of materials other than aluminum and formed in ways other than by extrusion. Although the invention has been described with reference to the wall members having tongues and the floor and top corner members having associated grooves or recesses, the wall members could have the grooves and the floor and top corner members could have the tongues. Differently shaped tongues and grooves could be used. Although the roof and its corners have been described as being dropped onto both the left and right side walls of the vehicle for ease of assembly, the roof could be articulated to lock it to one of the walls in accordance with the present teaching of articulated locking means. The keepers could be held in place by a number of different fasteners, or possibly even with double backed tape or glue, or other fastening means. Although particular cross sectional shapes have been shown in the drawings, those particular shapes have been chosen because they are believed to be extrusion friendly and otherwise well suited for manufacturing. Many different shapes could be used. Furthermore, many variations on the illustrative embodiments shown and described are possible. Although the invention is described as eliminating structural stresses on small fasteners such as screws, the teachings of the present invention could, in theory, be used in structures in which some stresses are carried by fasteners such as screws or rivets, while still incorporating the teachings of the invention. That is, use of the present invention, and the placing of some structural stresses on small fasteners, are not necessarily mutually exclusive. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A structural assembly for a vehicle wall comprising:
    a first structural member, the first structural member having a tongue extending therefrom, the tongue having a tongue engagement feature comprising at least one of an angle, a curve, and a protrusion at a distal portion thereof;
    a second structural member, the second structural member having a groove therein for receiving the tongue, the groove having a recess at a distal portion thereof;
    wherein when the tongue is inserted into the groove, the recess in the distal portion of the groove engages the tongue engagement feature; and
    a keeper configured to fit into gap formed between the first and second structural members; and
    wherein the keeper does not adhere to the first and second structural members when in the gap.

2. The structural assembly of claim 1 wherein the tongue and the groove are configured such that in order to insert the tongue fully into the groove, the distal portion of the tongue is first inserted partially into the groove with the first and second structural members at a first angle relative to each other, and then the structural members are articulated with the tongue moving further into the groove as the structural members are articulated, until the tongue engagement feature is lockingly engaged by the recess in the groove when the structural members have reached a final angle relative to each other.

3. The structural assembly of claim 1 wherein:
    the tongue is curved;
    the groove is curved, the shape of the curved groove generally corresponding to the shape of the curved tongue; and
    the curved tongue slides into the curved groove to be lockingly engaged thereby as the first structural member is rotated into a final position relative to the second structural member.

4. The structural assembly of claim 3 wherein the tongue and the groove are both generally J-shaped, and a curved bottom portion of the J-shaped tongue engages a curved bottom portion of the J-shaped groove to prevent the tongue from pulling out of the groove once the two structural members have been rotated into said final position.

5. The structural assembly of claim 3 wherein the curved groove is defined at least in part by:
    a curved groove wall on a first side of the groove, the curved groove wall having an arc of about 90°, the curved groove wall having an uppermost extent at a first vertical level; and a ledge on a second side of the groove opposite the first side, the ledge having an uppermost extent at a second vertical level lower than the first vertical level.

6. The structural assembly of claim 1 wherein the first structural member is a wall member and the second structural member is a floor member, and the wall member is tilted upright to lockingly engage the wall member with the floor member.

7. The structural assembly of claim 6 wherein the wall member defines a bottom wall member, and the assembly further comprises:
a plurality of wall studs welded to the bottom wall member;
a top wall member welded to the wall studs; and
foam material positioned between the wall studs.

8. The structural assembly of claim 1 further comprising:
the keeper that engages the first and second structural members to prevent the first and second structural members from relatively rotating, thereby holding the two structural members in a mutually locked position.

9. The structural assembly of claim 1 wherein:
the first and second structural members have respective surfaces that, when the structural members are engaged and locked together, are opposed from each other and form the gap therebetween; and
wherein the keeper fills the gap to prevent relative movement of the two structural members.

10. The structural assembly of claim 1 wherein the first structural member has an inwardly extending ledge for positioning and supporting an interior wall panel.

11. A method of locking a vehicle wall to a vehicle floor, comprising:
providing a wall having a wall articulating lock;
providing a wall support affixed to the vehicle floor, the wall support having a wall support articulating lock;
positioning the wall at an angle relative to vertical and such that the wall articulating lock partially engages the wall support lock;
tilting the wall upright into a generally vertical position, the wall articulating lock increasingly engaging the wall support lock as the wall is tilted upright to lock the wall to the wall support.

12. A wall and floor structural assembly comprising:
a wall having a rail adjacent a bottom edge thereof
a wall support having a support surface for supporting the wall, and a recess adjacent the support surface;
wherein the rail and the recess have complementary contoured shapes such that the wall member can be articulated relative to the wall support to engage the wall member to the wall support, the contoured shape of the recess engaging the complementary contoured shape of the rail to prevent the rail from being pulled directly upward away from the wall support when the wall is in a full upright position; and
a keeper that couples to the wall and the wall support to prevent rotation of the wall; and
wherein the keeper does not adhere to the wall and wall support when coupling the wall and the wall support.

13. An assembly for connecting a wall of a vehicle to another member of the vehicle, comprising:
a first member having a generally vertical protrusion;
a second member having a generally vertical recess for receiving the protrusion, the recess and the protrusion cooperatively engaging to prevent horizontal movement between the first and second members; and
a keeper;
wherein:

the first member has a first feature defining a first generally horizontal surface;
the second member has a second feature defining a second generally horizontal surface;
the keeper has features defining a third generally horizontal surface and a fourth generally horizontal surface, the keeper being slid generally horizontally into an engagement position with the first and second horizontal surfaces to prevent relative vertical movement of the first and second members;
whereby the first and second members are prevented from relatively moving both horizontally and vertically.

14. The assembly of claim 13 wherein:
the first and second members are rotated together in a first rotational direction to engage them in a vertically locked arrangement;
the first horizontal surface is opposite the second horizontal surface across a gap therebetween;
the keeper occupies the gap to prevent, in compression, relative rotation of the members in a second rotational direction opposite the first rotational direction.

15. The assembly of claim 14 wherein the first and second members and the keeper are adapted to carry all of the structural stresses of the assembly, and no structural stresses are placed on fasteners other than the keeper holding the first and second structural members together.

16. The assembly of claim 13 wherein:
the first member has a first generally horizontal recess into which a first portion of the keeper is inserted;
the second member has a second generally horizontal recess into which a second portion of the keeper is inserted, the two recesses being vertically offset from one another;
whereby the keeper acts in tension to prevent vertical separation of the two members.

17. The assembly of claim 16 wherein:
the first generally horizontal recess defines a longitudinal channel in the first member;
the second generally horizontal recess defines a longitudinal channel in the second member;
the first and second portions of the keeper comprise longitudinally extending rails inserted into the channels in the first and second members, respectively.

18. The assembly of claim 13 wherein the first and second members are metal extrusions.

19. The assembly of claim 13 wherein said keeper and the first and second members are dimensioned such that at least a portion of the keeper fits snugly with corresponding portions of the first and second members without fasteners.

20. The assembly of claim 13 wherein the keeper further comprises:
an integrally formed, longitudinal tubular member having a generally C-shaped cross section.

21. The assembly of claim 13 wherein the second member is adapted to be a top corner member of a recreational vehicle, and the top corner member has an upwardly facing concave channel integrally formed in an outer surface thereof.

22. The assembly of claim 13 wherein one of the members has a panel positioning feature selected from the group consisting of: a raised ledge protruding horizontally from one of the members, for positioning and supporting an interior wall panel;
a gap between one of the members and the keeper, for positioning and holding an exterior wall panel;
a recess for positioning a ceiling panel;
an upwardly facing recess for holding roof material; and a recess for retaining a portion of a wall panel and for retaining excess ceiling covering material.

23. A structural assembly for a vehicle comprising:
a wall member having a generally vertical protrusion;
a top corner member having a first recess therein for receiving the wall member protrusion;
a keeper configured to fit within a gap formed by the wall member and the top corner member for holding together the wall member and the top corner member, the keeper having an awning retainer integrally formed therein.

24. The structural assembly of claim 23 wherein the wall member and the top corner member have respective first and second channels integrally formed therein for receiving respective engagement portions of the keeper.

* * * * *